United States Patent Office 3,284,350
Patented Nov. 8, 1966

3,284,350
REMOVAL OF TIN AND FLUORIDE FROM
AQUEOUS SOLUTIONS OF THE SAME
Robert C. Williamson, Chesterton, Ind., assignor to National Steel Corporation, a corporation of Delaware
Filed Feb. 12, 1964, Ser. No. 344,495
13 Claims. (Cl. 210—46)

The present invention relates to the removal of tin and fluoride from aqueous solutions of the same.

Certain industrial operations generate aqueous waste that contains both tin and fluoride in solution. One of these is electrolytic tinplating from halogen tin lines. In such operations, wash solutions and other aqueous wastes are produced from rinsing sprays, the scrubbing of effluent fumes, the liquid effluent from tin recovery operations, and from other sources.

Both tin and the fluoride must be removed from or substantially reduced in such waste solutions, for two reasons: in the first place, the loss of large quantities of recoverable tin is economically unacceptable; and in the second place, the fluoride is a pollutant that cannot be pumped into streams and rivers in large quantity.

In the past, it has been conventional practice to remove and recover tin from aqueous solutions of this type by treating the solutions with sodium carbonate so as to precipitate the tetravalent tin solute as stannic hydroxide. However, such treatment was ineffective to precipitate or otherwise remove the fluoride from the solution. A separate treatment had to be provided for fluoride removal. Even if a single reagent could have been found that would precipitate both the tin and the fluoride, the recoverable stannic hydroxide sludge would be greatly diluted by precipitated fluoride and would be of correspondingly decreased market value.

Accordingly, it is an object of the present invention to provide methods for the removal both of tin and of fluoride from aqueous solutions of the same, while at the same time recovering a tin concentrate of desirably high tin content.

Another object of the present invention is the provision of methods for the removal both of tin and of fluoride from aqueous solution, characterized by high percentages of tin recovery.

Still another object of the present invention is the provision of methods for the removal both of tin and of fluoride from aqueous solution, characterized by low reagent cost.

Finally, it is an object of the present invention to provide methods for the separation both of tin and of fluoride from aqueous solutions, characterized in that such methods are relatively easy and inexpensive to practice, and reliably give results that are uniform and economically desirable.

Figure 1:
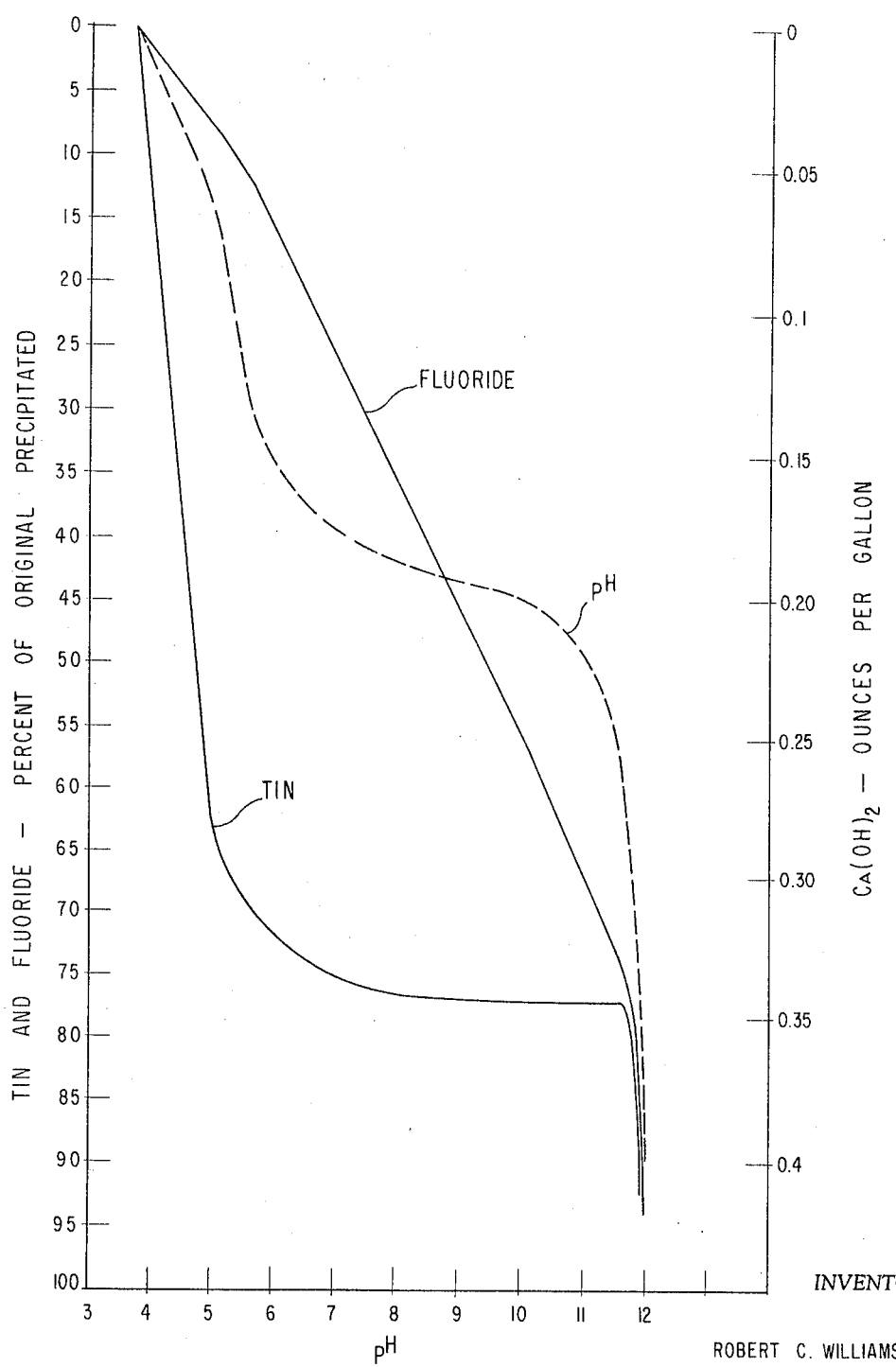
Figure 2:
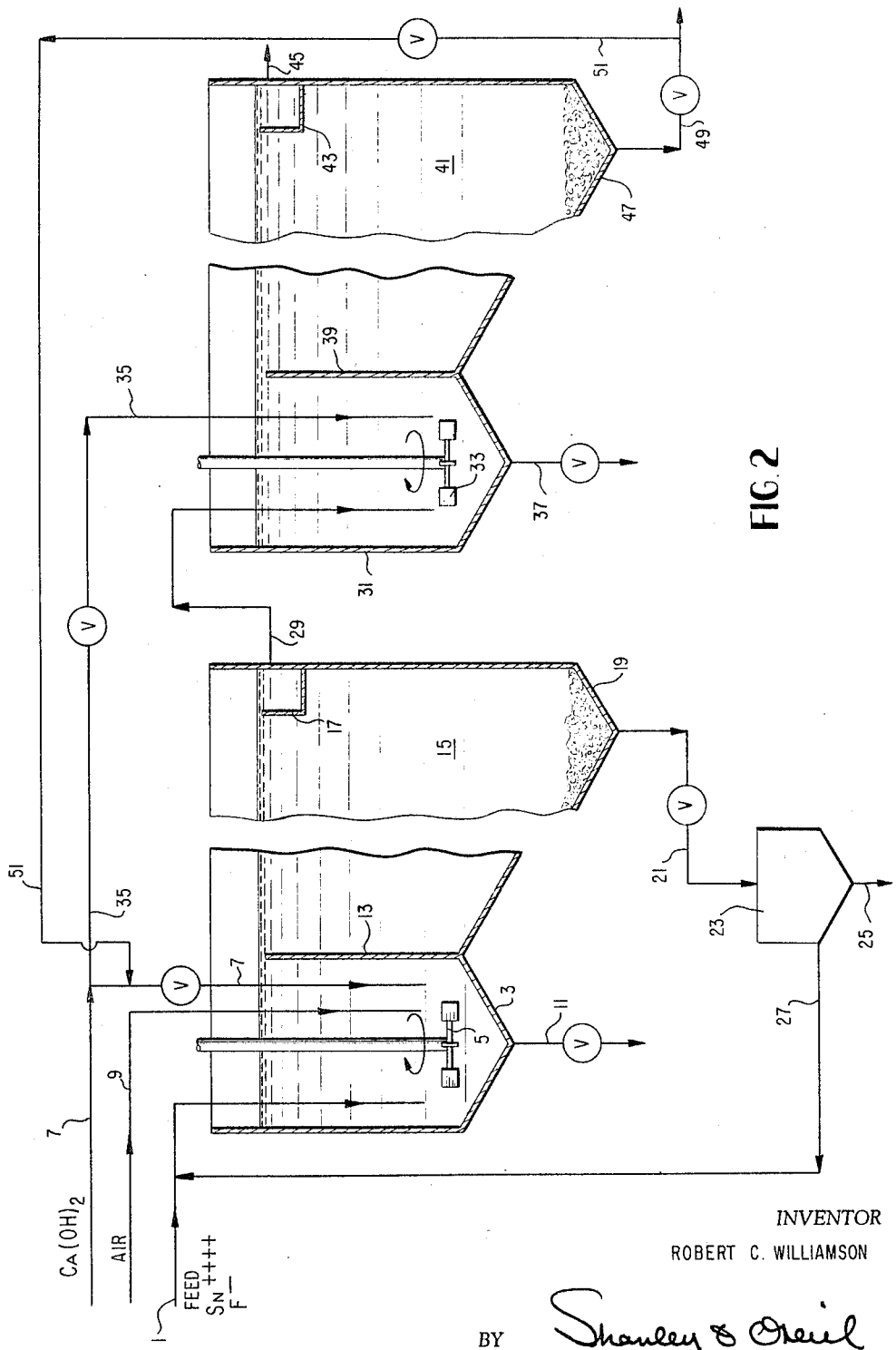

Other objects and advantages of the present invention will become apparent from a consideration of the following description, taken in connection with the accompanying drawings, in which:

FIGURE 1 is a combined graph of the curves of tin and fluoride precipitation vs. pH, and also of pH vs. precipitant addition; and FIGURE 2 is a schematic flow diagram of a representative cycle embodying the present invention.

Broadly stated, the present invention comprises the discovery that both tin and fluoride can be removed from aqueous solution by precipitation with calcium hydroxide, and that, moreover, the precipitation can be carried out stepwise in such a way that in at least one early precipitation stage, a greater percentage of the original tin solute can be precipitated at relatively low pH than of the original fluoride solute, while during a later precipitation stage, characterized by relatively high pH, a greater proportion of the original fluoride solute can be precipitated than of the original tin solute. In other words, the invention can be used to produce first a tin-rich precipitate and second a fluoride-rich precipitate. The tin-rich precipitate is valuable for recovery of its tin values, while the fluoride precipitate assures that the liquid can be discharged without giving rise to objectionably high levels of fluoride contamination.

The process of the present invention is best adapted for the treatment of large volumes of water in which the tin and fluoride are in relatively low concentration. For relatively small volumes of highly concentrated tin solute, it is preferable to rely on tin recovery by precipitation with sodium carbonate if fluoride is present only at such a low level as not to give rise to undesirable fluoride contamination.

The tin that is found in the solution treated by the present invention may be present in stannous form with a valence of +2 or stannic form with a valence of +4. If the waste water is from a halogen tinplating line, then the tin may be present chiefly in stannic form, and perhaps principally in the form of sodium fluorostannate ($Na_2SnF_6$). In addition, there may be some sodium fluorostannite ($Na_4SnF_6$). Moreover, if high concentrations of tin have previously been removed by treatment with sodium carbonate, then there will be some sodium fluoride in the effluent from the sodium carbonate treatment. There will also be various salts in solution which apparently do not affect the invention one way or the other.

In the case of such tin and fluoride solutions, the principal reactions of the invention upon treatment with calcium hydroxide appear to vary with pH and to proceed according to the following equations:

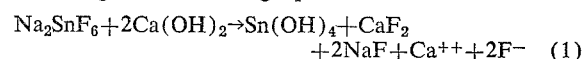
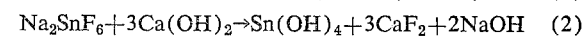

$$Na_2SnF_6 + 2Ca(OH)_2 \rightarrow Sn(OH)_4 + CaF_2 + 2NaF + Ca^{++} + 2F^- \quad (1)$$

$$Na_2SnF_6 + 3Ca(OH)_2 \rightarrow Sn(OH)_4 + 3CaF_2 + 2NaOH \quad (2)$$

The reaction proceeds first according to Equation 1 and then according to Equation 2, depending on the concentration of calcium hydroxide, which largely determines the pH. Thus, at low pH, Equation 1 obtains; while at high pH Equation 2 carries the reaction to completion.

It is also to be understood that Equations 1 and 2 are indicative of the precipitation mechanisms only at low and high pH, respectively, and do not foreclose the possibility of other or intermediate reactions represented by other equations.

HYDROGEN ION CONCENTRATION

The control of hydrogen ion concentration, expressed in terms of the negative reciprocal of its logarithm as pH, is quite important to the present invention. Calcium hydroxide is a base, and as it is progressively added to the waste solution, the pH rises. For the first stage, during which recoverable stannic hydroxide is precipitated, the pH should not be more than about 10, preferably not more than about 6. FIGURE 1 will show why this is so.

In FIGURE 1, the two curves represented in full line show the variation of the weight of tin deposition and fluoride deposition with pH. The broken line showing is the locus of the corresponding value of pH. In FIGURE 1, the left-hand ordinate shows the percentage of the original tin or fluoride which is precipitated at any given pH. The abscissa shows pH. Remembering that the slope of either the tin curve or the fluoride curve varies as the rate of tin or fluoride precipitation, it will be evident that a relatively tin-rich precipitate can be produced at those pH's at which the slope of the tin curve is greater than the slope of the fluoride curve. Such slopes occur up to about pH 5.6. Therefore, it can be said that at about pH 6, optimum conditions for tin recovery have been traversed. Above pH 6, where the slope of the fluoride line is substantially steeper than the slope of the tin curve, operation at such higher pH's in the first stage for tin recovery produces a stannic hydroxide sludge having unnecessarily high inclusions of calcium fluoride and undissolved calcium hydroxide. On the other hand, if tin recovery is discontinued below about pH 5, then the unprecipitated tin is so great as to represent inefficient operation of the system if the remainder of the tin is precipitated with the fluoride at relatively high pH.

At around pH 10, the rate of fluoride precipitation is very much greater than the rate of tin precipitation, as can be seen from noting the slope of the tin and fluoride curves at the pH 10 intersection. Nevertheless, operation up to about pH 10 must be considered to fall within the proper ambit of first stage precipitation, because in the region of pH 5–10, the pH curve is so nearly horizontal that it will be evident that a relatively small excess of calcium hydroxide can send the pH up precipitately. In other words, the upper values of the maximum pH range for first stage precipitation should be considerably as tolerable in the sense that they are economically feasible to practice although not at all preferred.

When the present specification speaks of "first stage" precipitation to produce a tin-rich precipitate, it will of course be understood that this first stage can be carried out in a plurality of precipitations or steps each characterized by progressively increasing pH.

In the second stage of precipitation, in which a fluoride-rich precipitate is brought down with still further calcium hydroxide, the pH at which final precipitation is effected should be at least about 10, preferably at least about 11. In this region, as will be evident from FIGURE 1, the slope of the fluoride curve is much steeper than that of the tin curve, with the result that proportionately much more of the original fluoride is precipitated in this second stage than of the tin. Again, the second stage precipitation may be carried out in a plurality of steps.

To establish initial operating conditions with regard to the quantity of calcium hydroxide to be added, it is preferable to exercise pH control rather than dosage control, as the latter requires less frequent quantitative analysis. However, pH control is difficult to effect, as the electrodes of the pH meters are rapidly attacked in fluoride solutions. A desirable method of procedure is first to establish initial conditions by pH control, and, once the operation has been on stream for a sufficiently long time to establish standard operating conditions, then to switch to dosage or flow rate control.

TEMPERATURE

Calcium hydroxide is anomalous to the solubility rule for common substances, in that it is less soluble at high temperature than at low temperature. Therefore, it is preferred to practice the invention at lower temperatures, so as to obtain maximum efficiency of operation and to minimize the quantity of undissolved lime in the precipitate.

However, sodium carbonate may be present either in the solutions as they arrive for treatment, or it may be introduced during treatment by reaction between the sodium hydroxide of Equation 2 and the carbon dioxide in the air. Moreover, sodium carbonate follows the usual solubility rule of being more soluble at high temperature than at low temperature. Therefore, operation at high temperature promotes the precipitation of unreacted calcium hydroxide, while operation at low temperature promots the precipitation of sodium carbonate. But as calcium hydroxide is present in greater quantity, low temperature operation is preferred so as to reduce to a minimum the non-stannic precipitates in the sludge.

The optimum temperature range is about 10° C. to 25° C. for both stages of precipitation. Therefore, the operation can be conducted at ambient temperatures. Within this optimum temperature range of 10° C. to 25° C., the calcium hydroxide solubility and the calcium fluoride precipitation both tend to maintain about the same ratio regardless of temperature.

At temperature higher than about 25° C., the calcium hydroxide solubility drops and the proportion of calcium in the sludge and in suspension in solid phase accordingly increases.

Within the preferred temperature range, a reduction in temperature reduces the calcium hydroxide needed to precipitate tin in the first stage of this two-stage process. However, the total calcium hydroxide needed both for tin and for fluoride precipitation is not reduced by operating adjacent the lower end of the preferred range, as more calcium hydroxide is needed in the second or fluoride precipitation step for the same total. Above about 25° C., however, the total calcium hydroxide requirement for the two steps increases.

Therefore, the preferred reaction medium is a liquid aqueous medium at a temperature not more than about 25° C., both in the first stage and in the second stage, so as to reduce calcium hydroxide requirements and to yield higher proportions of tin in the first stage sludge.

Also, operation at lower temperature is preferred because cold liquids suffer less thermal agitation than warm liquids and the suspended solids therefore settle faster.

USE OF AIR

It has been found that admixture of air with the reaction solution in the first stage of precipitation results in a higher percentage of tin in the precipitate, the use of a little less calcium hydroxide, and the stabilization of the pH at lower levels. Without air, there is a tendency for the pH to rise rapidly and uncontrollably in the mid-range, about pH 7, as the pH curve there is so nearly horizontal.

It is not known with certainty why air has these beneficial results. It is believed, however, that any stannous tin present, as in the form of sodium fluorostannite, would not be precipitated as such. Sodium fluorostannite, for example, would not react with calcium hydroxide in a reaction similar to those of Equations 1 and 2 above. It may be, therefore, that stannous tin is oxidized to stannic by the oxygen of air, according to an equation such as

$$2Na_4SnF_6 + 2H_2O \rightarrow 2Na_2SnF_6 + 4NaOH \qquad (3)$$

If so, then the use of air could account for increased tin in the precipitate for this reason.

The reason for lower and more stable pH upon the use of air, and also at least to some extent an increase in tin in the precipitate, might be because of destruction of sodium hydroxide produced in the reaction of Equation 2 by the carbon dioxide that is always present in air, according to the equation

$$2NaOH + CO_2 \rightarrow Na_2CO_3 + H_2O \qquad (4)$$

The $Na_2CO_3$ thus formed would be an efficient agent for precipitating tin according to the equation

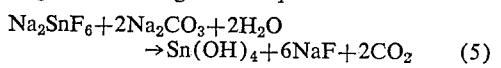
$$Na_2SnF_6 + 2Na_2CO_3 + 2H_2O$$
$$\rightarrow Sn(OH)_4 + 6NaF + 2CO_2 \qquad (5)$$

COMPARISON WITH SODIUM CARBONATE METHOD

As noted above, sodium carbonate had heretofore been used to recover tin from waste solutions, by a reaction proceeding according to Equation 5. However, sodium carbonate will not precipitate fluoride from solution. Therefore, if sodium carbonate were used to precipitate tin, some second treatment would have to be used to precipitate fluoride.

Calcium hydroxide precipitates fluoride according to the equation

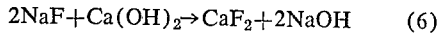
$$2NaF + Ca(OH)_2 \rightarrow CaF_2 + 2NaOH \qquad (6)$$

But it will be apparent from Equation 5 above that for every mol of tin precipitated by sodium carbonate, 6 mols of sodium fluoride are created. Therefore, if the effluent from tin removal by the use of sodium carbonate according to Equation 5 were treated with calcium hydroxide to remove fluoride, just as much calcium hydroxide would have to be used as if the present invention were practiced. In other words, the removal of tin by the use of sodium carbonate, followed by the removal of fluoride by calcium hydroxide, effects no economy at all in the use of calcium hydroxide, for just as much calcium hydroxide must be used in that method as is used in the present invention.

Moreover, when sodium carbonate is used for tin removal, the pH must be raised to about 9 in order to precipitate most of the tin from solution as stannic hydroxide; while with calcium hydroxide, it is necessary to go to a reaction pH of only about pH 5 or 6 for tin removal. To precipitate the tin with calcium hydroxide, therefore, requires only about two-thirds as much calcium hydroxide as the quantity of soda ash required to remove tin, in view of the higher pH that must be achieved by the use of soda ash. Moreover, in view of the relationship between temperature and the solubility of sodium carbonate, the sodium carbonate method must be practiced at a temperature of at least 30° C., preferably about 50–60° C., thereby requiring the addition of heat.

OPERATING CYCLE

A typical cycle of operation of the present invention is shown in FIGURE 2, which is a schematic flow sheet of one of the many embodiments in which the present invention can be carried out. As is shown in FIGURE 2, the waste water containing tin and fluoride in solution is introduced to the cycle through a feed conduit 1 and proceeds into a first mixing chamber 3. In mixing chamber 3, a rotor 5 vigorously agitates the feed water in admixture with calcium hydroxide supplied through a lime conduit 7 and air supplied through an air conduit 9. Relatively heavy particles, such as sand and the like introduced with the lime, may settle out in the mixing chamber, and for this purpose a valved clean-out conduit 11 is provided for removing and discarding such material.

Waste water from mixing chamber 3 continuously overflows over a horizontal weir 13 into a relatively large settling chamber 15. Settling chamber 15 may be of any of a variety of constructions, either circular or rectilinear or the like, and in the illustrated embodiment is provided at its end remote from weir 13 with a launder 17. Liquid that has been treated with lime and air overflows weir 13 and moves slowly toward launder 17, a relatively large proportion of stannic hydroxide precipitate and a relatively small proportion of calcium fluoride precipitate, plus any undissolved calcium hydroxide, settling out in settling chamber 15 and collecting on the bottom of the settling chamber, where it moves by gravity or may be propelled toward a sump 19 for the collection of first stage precipitate.

This first stage precipitate may then be removed either continuously or batchwise through a valve controlled discharge conduit 21 in the form of a tin-rich sludge. The sludge flows through conduit 21 to a centrifugal separator 23 in which at least most of the water is removed from the sludge. The relatively dry sludge is discharged either continuously or batchwise through a discharge conduit 25, while the water from the separator is returned to feed conduit 1 through a return conduit 27. This water will contain some fine precipitate not removed in the centrifugal separator, as well as various products or reagents of the reaction that must be recycled either for economical tin recovery or for precipitation to avoid pollution. Accordingly, very little water leaves the cycle through discharge conduit 25.

Substantially all of the water, therefore, proceeds from the first stage at the left of FIGURE 2 to the second precipitation stage at the right of FIGURE 2. Specifically, water with most of the dissolved tin removed leaves launder 17 through discharge conduit 29 and proceeds to a second stage mixing chamber 31, in which a rotor 33 agitates the feed liquid into intimate association with further calcium hydroxide introduced into mixing chamber 31 through a valved lime conduit 35 that is a branch of conduit 7. As before, coarse solids introduced into mixing chamber 31 can be cleaned out through a valved clean-out conduit 37.

As also in the first stage precipitation, so also in the second stage precipitation the liquid at the top of mixing chamber 31 continuously overflows over a weir 39 into a second stage settling chamber 41 provided with a launder 43 at its end opposite weir 39. Water is continuously removed from launder 43 through a discharge conduit 45. This water is sufficiently free from dissolved fluoride and other contaminants to be sewered or otherwise disposed of in streams, rivers, settling ponds and the like.

A second stage precipitate collects in the sump 47 of second stage settling chamber 41 and may be continuously or batchwise removed through a valved discharge conduit 49. This sludge that precipitates in the second stage is fluoride rich as distinguished from the tin-rich precipitate of the first stage of precipitation. This is to say that in the first stage, a greater percentage of the original tin is precipitated than of the original fluoride, while in the second stage, a greater percentage of the original fluoride is precipitated than of the original tin. Preferably, a greater absolute quantity of tin is precipitated in the first stage than in the second stage and a greater absolute quantity of fluoride is precipitated in the second stage than in the first stage.

The solids withdrawn through discharge conduit 49 will also contain a minor proportion of tin. In certain cases, this low-tin sludge may nevertheless be marketable for its tin content. Also, it is desirable to recycle a portion of this second stage sludge to the first stage precipitation, through a valve return conduit 51. This second stage sludge will contain some undissolved calcium hydroxide and some recoverable stannic hydroxide, and the recirculation of at least a portion of the second stage sludge performs the useful function of (1) reducing calcium hydroxide costs, (2) recovering tin, and (3) reducing the quantity of dumped solids. The recirculation of second stage precipitate to the first stage precipitation also furthers the separation of stannic hydroxide and calcium fluoride.

The first and second stages of precipitation differ from each other as to pH in that the pH in the first stage is substantially lower than the pH in the second stage, thereby to promote selective precipitation of tin in the first stage and fluoride in the second stage. But the precipitations in the first and second stages also preferably differ from each other as to precipitation time. Specifically, in the first stage, the precipitation time is preferably substantially shorter than in the second stage. Moreover, stannic hydroxide produced by the present invention tends to settle much faster than calcium fluoride produced by the present invention, so that a relatively short settling time in the first stage promotes the separation and recovery of stannic hydroxide in the first stage with relatively little calcium fluoride contamination or dilution; while a relatively long settling time in the second stage promotes the settling of proportionately more calcium fluoride than stannic hydroxide. The recycling of second stage precipitate to first stage precipitation, therefore, promotes the separation of tin and fluoride by permitting that stannic hydroxide that was carried over to the second stage to have another opportunity to settle in the first stage. The shortness of the settling time in the first stage, however, does not give recycled calcium fluoride the same opportunity to settle in the first stage, so that recycling of fluoride-rich second stage precipitate to the first stage precipitation naturally increases the tin concentration of the first stage precipitate without correspondingly increasing the fluoride in the tin-rich first stage precipitate.

Example

In order to enable those skilled in this art to practice the invention, the following illustrative example is given:

Waste water at a temperature of 25° C. is introduced at a flow rate of 100 gallons per minute through conduit 1. This waste water has a pH of 3.7, a total tin concentration of 0.13 ounce per gallon, and a total fluoride concentration of 0.173 ounce per gallon. It is admixed with 75 cubic feet per minute of air introduced through conduit 9 and 0.13 ounce of lime per gallon of feed is introduced in the form of a calcium hydroxide slurry through conduit 7. The treated feed has an average dwell time of 20 minutes in mixing chamber 3 and an average dwell time of 40 minutes in settling chamber 15.

The pH in settling chamber 15 is 5.6. The sludge is removed through conduit 21 at a rate of 1.4 pounds per minute on a dry solids basis and contains 69.2% of the original tin, as stannic hydroxide, and 12.3% of the original fluoride content, as calcium fluoride. The sludge itself is 40% tin, that is, 63% stannic hydroxide. The calcium fluoride precipitated in the first stage is 19% of the sludge by weight, while the undissolved calcium hydroxide is 9% of the sludge by weight. The remaining 10% of the sludge is made up of about half sand and other insolubles from the lime slurry, or 5% of the total weight of the sludge, while the remaining 5% of the total is a group of minor constituents such as iron, cyanides, etc.

The liquid effluent from the first stage leaves through conduit 29 and has about the same flow rate as originally, that is, about 100 gallons per minute. It contains 0.04 ounce per gallon of tin and 0.152 ounce per gallon of fluoride. It is introduced into second stage mixing chamber 31 and is there admixed by agitation from rotor 33 with a slurry of calcium hydroxide at the rate of 0.26 ounce per gallon of calcium hydroxide based on the flow rate of the influent waste water. This addition of calcium hydroxide brings the pH to 11.95 and reduces the tin concentration remaining in solution to 0.01 ounce per gallon and the fluoride concentration to 0.011 ounce per gallon.

By this time, 92.3% of the original total tin and 93.8% of the original total fluoride have been precipitated. The second stage precipitate thus contains 23.1% of the original tin and 81.5% of the original fluoride. The tin content of this second stage precipitate is 5% by weight, which is to say that the second stage precipitate contains about 8% stannic hydroxide, with the balance principally calcium fluoride and calcium hydroxide. To achieve this precipitate, the liquid in the second stage has an average dwell time in the mixing section of 20 minutes and an average dwell time in the settling section of 200 minutes.

Precipitate is removed through valved conduit 49 at a rate of 3.7 pounds per minute on a dry solids basis. Twenty percent of the precipitate is recycled through conduit 51.

From a consideration of the foregoing disclosure, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A method of removing tin and fluoride from solution in water, comprising adding, to water containing dissolved tin in the stannic oxidation state and fluoride, calcium hydroxide in an amount to precipitate a greater proportion of the dissolved tin than of the dissolved fluoride, the precipitate containing stannic hydroxide, separating the precipitate containing stannic hydroxide from at least most of the water, and thereafter adding to the water more calcium hydroxide in an amount to precipitate a greater proportion of the original dissolved fluoride than of the original dissolved tin.

2. A method as claimed in claim 1, and separating the second precipitate from at least most of the water.

3. A method as claimed in claim 1, the water being at a temperature no higher than about 25° C.

4. A method as claimed in claim 1, the first precipitation being conducted at a pH no greater than about 10.

5. A method as claimed in claim 1, the first precipitation being conducted at a pH no greater than about 6.

6. A method as claimed in claim 1, the second precipitation being conducted at a pH at least about 10.

7. A method as claimed in claim 1, the second precipitation being conducted as a pH at least about 11.

8. A method as claimed in claim 1, the first and second precipitates being collected by settling, the first precipitate being collected after a substantially shorter settling time than the second precipitate.

9. A method of removing tin and fluoride from solution in water, comprising adding, to water containing dissolved tin and fluoride, calcium hydroxide in an amount to precipitate in a first precipitation step a greater proportion of the dissolved tin than of the dissolved fluoride, introducing oxygen beneath the surface of the water during the said first precipitation step, separating precipitate from at least most of the water, and thereafter adding to the water more calcium hydroxide in an amount to precipitate in a second precipitation step a greater proportion of the original dissolved fluoride than of the original dissolved tin.

10. A method of removing tin and fluoride from solution in water, comprising adding, to water containing dissolved tin and fluoride, calcium hydroxide in an amount to precipitate in a first precipitation step a greater proportion of the dissolved tin than of the dissolved fluoride, introducing air beneath the surface of the water during the first precipitation step, separating precipitate from at least most of the water, and thereafter adding to the water more calcium hydroxide in an amount to precipitate in a second precipitation step a greater proportion of the original dissolved fluoride than of the original dissolved tin.

11. A method of removing tin and fluoride from solution in water, comprising adding, to water containing dissolved tin and fluoride, calcium hydroxide in an amount to form a first precipitate in a first precipitation step which contains a greater proportion of the dissolved tin than of the dissolved fluoride, separating the first precipitate from at least most of the water, recycling a portion of the separated water to the first precipitation step, and adding to a second portion of the separated water more calcium hydroxide in an amount to form a second precipitate containing a greater proportion of the original dissolved fluoride than of the original dissolved tin.

12. A method of removing tin and fluoride from solution in water, comprising adding, to water containing dissolved tin and fluoride, calcium hydroxide in an amount to form a first precipitate in a first precipitation step which contains a greater proportion of the dissolved tin than of the dissolved fluoride, separating the first precipitate from at least most of the water, thereafter adding to the water more calcium hydroxide in an amount to form a second precipitate containing a greater proportion of the original dissolved fluoride than of the original dissolved tin, and recycling a portion of the second precipitate to the first precipitation step.

13. A method as claimed in claim 12, the first and second precipitates being collected by settling, the first precipitate being collected after a substantially shorter settling time than the second precipitate.

(References on following page)

References Cited by the Examiner

UNITED STATES PATENTS

| | | | |
|---|---|---|---|
| 2,914,474 | 11/1959 | Hillyer et al. | 23—88 X |
| 3,082,157 | 3/1963 | Francisco et al. | 204—54 |

FOREIGN PATENTS 16,874  1892  Great Britain.

OTHER REFERENCES

Gershon, S.D. et al.: Fluorides and the Solubility of Powdered Tooth Enamel, Drug and Cosmetic Industry, February 1958, 82, 2, pp. 160, 161 and 251–257, pp. 161 and 251 particularly relied on.

Mellor: Comprehensive Treatise on Inorganic and Theoretical Chemistry, 1923, vol. III, pp. 903–905, Longmans, Green & Co.

Morgulis, S.: Studies on the Chemical Composition of Bone Ash, J. Biol. Chem. 93, 455 (1931).

Smith, F. A., et al.: Fluoride Removal, etc., Nature, Dec. 21, 1957, pp. 1421–1422.

MORRIS O. WOLK, *Primary Examiner.*

MICHAEL E. ROGERS, *Examiner.*

UNITED STATES PATENT OFFICE
CERTIFICATE OF CORRECTION

Patent No. 3,284,350                                                         November 8, 1966

Robert C. Williamson

It is hereby certified that error appears in the above numbered patent requiring correction and that the said Letters Patent should read as corrected below.

Column 3, line 23, for "considerably" read -- considered --; line 69, for "promots" read -- promotes --; column 4, line 46, for "$2Na_4SnF_6 + 2H_2O \rightarrow 2Na_2SnF_6 + 4NaOH$" read -- $2Na_4SnF_6 + O_2 + 2H_2O \rightarrow 2Na_2SnF_6 + 4NaOH$ --.

Signed and sealed this 5th day of September 1967.

(SEAL)
Attest:

ERNEST W. SWIDER                                         EDWARD J. BRENNER
Attesting Officer                                            Commissioner of Patents